United States Patent [19]

Hanse et al.

[11] Patent Number: 5,691,061
[45] Date of Patent: Nov. 25, 1997

[54] REFRACTORY SHAPE HAVING AN EXTERNAL LAYER CAPABLE OF FORMING A LAYER IMPERMEABLE TO GASES AND PROCESS FOR ITS PREPARATION

[75] Inventors: Eric Hanse, Elouges, Belgium; Phillipe Dumas, Feignies, France

[73] Assignee: Vesuvius Crucible Company, Wilmington, Del.

[21] Appl. No.: 490,792

[22] Filed: Jun. 15, 1995

[30] Foreign Application Priority Data

Jun. 15, 1994 [FR] France ............................ 94 07413
Nov. 28, 1994 [FR] France ............................ 94 14337

[51] Int. Cl.⁶ .................................................. B22D 11/10
[52] U.S. Cl. .................... 428/408; 501/99; 501/100; 222/591; 222/600; 222/601; 222/606; 222/607; 428/688; 428/689; 428/698; 428/701; 428/702; 428/446
[58] Field of Search ................................ 428/688, 689, 428/698, 699, 701, 702, 402, 446; 501/99, 100; 222/591, 600, 601, 606, 607

[56] References Cited

U.S. PATENT DOCUMENTS

| | | | |
|---|---|---|---|
| 4,108,675 | 8/1978 | Tomita | 501/100 |
| 4,210,264 | 7/1980 | Kondo | 222/591 |
| 4,676,412 | 6/1987 | Tsuchinari | 222/591 |
| 5,086,957 | 2/1992 | Ozeki | 222/607 |
| 5,198,126 | 3/1993 | Lee | 222/606 |
| 5,335,833 | 8/1994 | Rancoule | 222/600 |
| 5,348,203 | 9/1994 | Andoh | 222/206 |
| 5,370,370 | 12/1994 | Benson | 266/236 |

FOREIGN PATENT DOCUMENTS

| | | |
|---|---|---|
| 0198925 | 10/1986 | European Pat. Off. . |
| 0423793 | 4/1991 | European Pat. Off. . |
| 0503316 | 9/1992 | European Pat. Off. . |
| 2316027 | 1/1977 | France . |
| 3805334 | 8/1989 | Germany . |
| 4100352 | 7/1991 | Germany . |
| 5154627 | 6/1993 | Japan . |
| 5154628 | 6/1993 | Japan . |
| 75140 | 1/1978 | Luxembourg . |
| 2095612 | 10/1982 | United Kingdom . |
| 2110971 | 6/1983 | United Kingdom . |
| 2135918 | 9/1984 | United Kingdom . |

*Primary Examiner*—Archene Turner
*Attorney, Agent, or Firm*—Webb Ziesenheim Bruening Logsdon Orkin & Hanson, P.C.

[57] ABSTRACT

The invention concerns a component for the pouring of steel that has a body (2) of a refractory material containing carbon. It has a layer (10) that covers the body partially or completely and is capable of forming a surface layer (10a) that is oxidized and densified and is impermeable to gases when it is brought to a temperature above 1000° C. The layer (10) is comprised of a refractory material containing sintering precursors chosen in the group consisting of calcined alumina, reactive calcined alumina, silica fumes and clays.

15 Claims, 4 Drawing Sheets

REFRACTORY SHAPE HAVING AN EXTERNAL LAYER CAPABLE OF FORMING A LAYER IMPERMEABLE TO GASES AND PROCESS FOR ITS PREPARATION

BACKGROUND OF THE INVENTION

In the continuous casting of steel, pieces of refractory material are used to channel and regulate the flow of liquid steel and protect it from reoxidation when it flows from a ladle to a distributor and from the distributor to a continuous casting mold. The refractory material is subject to severe conditions of use. It undergoes thermal stresses, erosion by the molten steel, oxidation and in general all the high temperature reactions that result from interactions between the constituents of the refractory material and the steel.

The refractory materials used in steelmaking generally contain carbon. They frequently utilize a carbon bond and are composed of several refractory oxides such as alumina, zirconia, clay, magnesia, silica, silicon carbide or other dense grains. These refractories also generally contain significant amounts of carbon in the form of graphite, amorphous graphite, carbon black and an additional amount of carbon from the binder used.

The invention concerns a shaped article for pouring steel. This shaped article has a body formed of a refractory material containing carbon. It is applicable in particular for pouring steel between a ladle and a continuous casting distributor or tundish and for pouring steel between the tundish and a continuous casting mold.

The invention also concerns a heat treatment process for a shaped article made from a refractory composition of the present invention.

A metal pouring spout that has a body of refractory material in which a flow channel is effected for the molten metal is already known (EP 2 695 848). The spout has an annular chamber arranged around the channel in the vicinity of the periphery of this channel and extends practically over its entire length. The chamber is connected to means for creating a vacuum. It forms a shield to the migration of gaseous products toward the flow channel. The spout can also have a jacket of refractory material without carbon interposed between the periphery of the channel and the evacuated chamber.

The vacuum created is maximal in the zone localized around the annular chamber. But with increasing distance from this chamber, the complex network of porosity results in substantial charge losses. Consequently, the depression decreases, which considerably limits the evacuation of the gases formed. It is thus very difficult to eliminate the gases in direct proximity of the contact zone of the refractory with the liquid steel.

A pouring stopper rod for controlling the flow of molten metal from a ladle or tundish is also known (GB-A-2 095 612). The stopper rod has a body and reinforced nose forming the end of the body and is of a material different than that of the body. The material of the body and that of the nose are copressed in single operation. In other words, two powders of different composition, e.g., graphite alumina for the body and zirconia or magnesia for the nose, are introduced simultaneously in the same mold and then copressed and fired simultaneously.

However, in a stopper rod of this type, the cohesion of the alumina, zirconia and/or magnesia grains is obtained by a bond of the carbon type, i.e., a bond in which the carbon contained in the mixture constitutes by hot polymerization a lattice that encloses the different grains.

Aggressive grades of steels with a high oxygen content that are currently made and which are not always "killed", that is, deoxidized, for example, with aluminum or silicon, or which are not sufficiently killed, erode the nose of a stopper rod of this type. This erosion results in a short service life of the stopper rod and necessitates its frequent replacement.

In addition to erosion problems, reactions occur between chemical compounds, particularly gaseous ones, which can form at high temperature in the refractory material constituting the nose of the stopper rod and in the molten steel. For example, carbon monoxide reduces some elements present in the liquid steel at the surface of the nose and causes the precipitation of oxides, especially aluminum oxide, on this surface. The progressive oxide deposits eventually prevent a complete closure of the pouring channel in the tundish bottom.

An object of the present invention is to provide a refractory material composition, method and article made therefrom, for the pouring of steel that remedies these shortcomings of the prior art. This refractory article makes it possible to completely inhibit the reactions between the chemical compounds, particularly gaseous ones, that form at elevated temperature in the refractory material constituting the body of the refractory article and in the liquid steel.

In addition, the shaped article of the invention is easy to produce at a low cost.

These goals are achieved according to the invention in that the refractory shape has a layer that partially or totally covers the body and is capable of forming a layer that is impermeable to gases, oxidized and densified when it is brought to a temperature above 1000° C.

Due to the presence of a layer impermeable to gases, the chemical compounds, particularly gaseous ones, that can form at elevated temperatures in the refractory material constituting the body of the shaped article and in the liquid steel are no longer in direct contact and the reactions cannot occur. A large number of the disadvantages of shaped pouring articles of the prior art are remedied in this manner.

For example, in the case of a spout, the plugging phenomena that occur when the carbon monoxide forming in the refractory reduces some of the elements present in the liquid steel at the surface of the steel flow channel and induces the precipitation of oxides, especially aluminum oxide, on this surface are remedied. These oxide deposits progressively plug the channel of the spout, which perturbs regulation and sharply reduces its service life. Due to the fact that the gas exchanges between the refractory body of the spout and the steel are prevented according to the invention, the plugging phenomena previously experienced are quite substantially reduced and the quality of the steel poured is improved. The cast steel is cleaner and has fewer inclusions.

The presence of a dense, impermeable layer also has other advantages. It reduces the corrosion phenomena.

In effect, in steels with a high oxygen content, corrosion of the refractory material is generally accelerated by attack of the carbon bond by oxygen, which is dissolved in substantial amounts. It also reduces the degradation of the purity of the steel that generally occurs through the take-up of nitrogen due to a passage of air through the refractory material.

A hard, dense layer without carbon avoids such phenomena.

In the case of a stopper rod, the resistance of the nose to steels that are not killed or which are not sufficiently killed is very substantially increased. The service life of the stopper rod is prolonged and substantial savings result for the user. Oxide deposits on the surface of the nose are also avoided, such that regulation of the steel is not perturbed. A tight closure of the pouring channel remains permanently possible, even after a long pouring sequence.

SUMMARY OF THE INVENTION

The external layer of the spout or stopper rod is preferably comprised of a refractory material containing sintering precursors. These precursors are designed to favor the sintering phenomena, i.e., the grain-to-grain bond. It permits the sintering to take place at a lower temperature and be complete within a shorter time.

These sintering precursors are notably chosen in the group comprised of calcined alumina, reactive calcined alumina, fumed silica, clays and fine particles (<50 microns) of oxides.

The external layer is preferably of a material containing at least 4% and no more than 9% of carbon by weight, including the carbon contained in the binder used, 1.5–6% of which is in the form of graphite. The total carbon ideally will not exceed 5% in total weight.

The external layer can be comprised of an insert produced separately from the body and then assembled to this body. It can also be copressed at the same time as the body of the spout.

The same binder is preferably used for binding the material constituting the body of the casting and the material constituting the external layer. The use of the same binder offers a greater facility of fabrication, particularly when the casting is copressed. In effect, in the latter case, it would be very difficult—perhaps impossible—to copress a piece when two different binders are used.

According to a preferred mode of implementation, the material of the external layer contains agents for reducing the permeability. These agents are preferably chosen in the group comprised of borax, silicon carbide, boron carbide, boron nitride and metallic additions and silicon in particular. These permeability reducing agents are for the purpose of creating a layer with reduced permeability, which is added to the oxidized dense layer impermeable to gases, which is formed by sintering the wall of the pouring channel.

In a preferred embodiment, the external layer is comprised of at least 80% alumina and is not covered with a glaze. It has a thickness less than 10 mm and the thickness of the sintered dense layer impermeable to gases is less than 5 mm.

The invention also concerns a process for making a shape according to the invention.

According to this process, a sintered dense layer impermeable to gases is formed at the surface of the pouring channel during the heat treatment stage.

The heat treatment stage is preferably carried out by bringing the piece to a temperature of 1000° C. in less than 20 minutes.

Other characteristics and advantages of the present invention will become evident in reading the following description and from the actualization examples given by means of illustration and in no way limiting, with reference to the attached Figures.

DETAILED DESCRIPTION OF THE INVENTION

Figure 1:
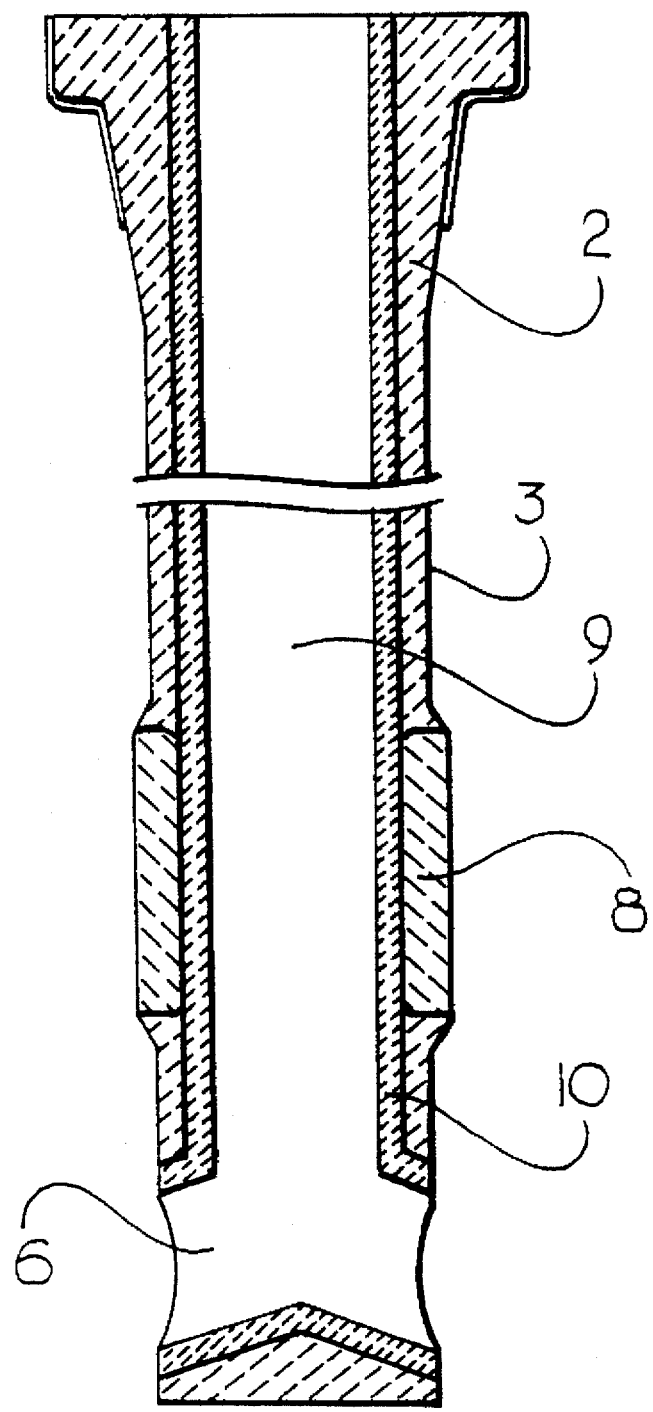
FIG. 1 is a longitudinal sectional view of a pouring spout or tube according to the present invention.

The pouring spout shown in FIG. 1 is designed to be placed under a molten metal distributor such as a tundish. It can be fastened under this distributor in a fixed position, e.g., cemented in a seat brick or by means of a bayonet mechanism or the like. It can also be placed in a tube changing machine that permits a rapid replacement of one tube with another in a known manner. The spout has a body designated by reference 2, and an upper part through which the liquid steel penetrates into a flow channel 9 that traverses the spout from one end to the other. In the example shown, the liquid metal flows through orifices 6 arranged laterally with respect to the body. Finally, in a familiar manner, the pouring spout has a slagline collar 8 of a material resistant to erosion by the mold powder layer covering the top of the mold. This collar is placed at the level of the steel in the continuous casting mold where the covering mold powder layer floats on the liquid steel. The two orifices 6 deliver the molten steel below the metal level in the mold to prevent any contact with air and thus avoid unwanted oxidation of the molten metal.

The body 2 of the spout is comprised of a traditional refractory material, e.g., a material containing 20–30% carbon and one or more refractory oxides such as alumina, zirconia, silica, magnesia, and the like. The body 2 is coated externally with a layer of a glaze 3 which has the purpose of preventing oxidation of the refractory material during preheating and use. The inside of the pouring channel 4 comprised of a refractory material with a small content of graphite is surrounded by a liner or jacket 10. The total firing loss of this material is less than 9%. This means that when this material is oxidized during the preheating sage of the spout, the graphite that it contains and the carbon contained in the binder represent 9% or less of the total refractory weight of the jacket 10. In addition, the jacket 10 contains a substantial mount of a refractory oxide such as alumina. This quantity is at least equal to 80%. Finally, the material constituting the liner 10 contains sintering precursors, notably calcined alumina, reactive calcined alumina, fumed silica or clays. The sintering precursors are grains of small size, i.e., grains whose specific surface is large. Consequently, the contact surface between the grains is increased. Calcined alumina presents a substantial specific surface and reactive calcined alumina an even more substantial specific surface. Fumed silica produces an alumina-silica reaction to create mullite. Densification of the jacket then takes place by mullitization. The clay-type systems also create ceramic bonds at a relatively low temperature on the order of 1000°–1100° C.

Due to the presence of one or more of these sintering precursors, a grain-to-grain type bond can be created between the alumina grains (ceramic bond) at a relatively low temperature, e.g., 1000° C. This layer is dense, hard and has pores of small diameter. It is thus impermeable to gases. This layer is preferably formed during the preheating of the spout. The preheating operation makes it possible to oxidize the carbon contained in the jacket 10 and thus eliminate it. A layer without carbon is thus obtained on the surface of the flow channel 9 of the spout. It should be noted, however, that contrary to the endeavors observed previously, this layer without carbon has only a slight thickness. For example, if the total thickness of the jacket is 10 mm. the thickness of the decarburized layer will typically be 3 mm and no more than 5 mm. It is thus evident that a substantial portion of the thickness of the jacket is not decarburized during the preheating. In fact, two simultaneous phenomena are observed during this operation. On the one hand, the oxidation of carbon, which increases the permeability of the jacket material to a greater degree, the higher the carbon content. This is why the carbon content of the jacket material should generally not be high, and in any case, it should not exceed 9%. On the other hand, in parallel with the oxidation of carbon the sintering phenomenon takes place, which tends on the contrary to create an impermeable layer that opposes the continuation of decarburization to the interior of the refractory material. For the spout to function satisfactorily, it is necessary that the sintering of the superficial layer rapidly outweighs its oxidation. This is why the sintering precursors that were mentioned previously were provided and which had the purpose of facilitating and accelerating it.

It is possible to produce the jacket 10 separately from the body of the spout 2 and then insert it in this body. However, this is not the process that was used for making the spout shown in FIG. 1. The latter was, in fact, produced by the process of isostatic copressing. Two mixtures, one corresponding to the composition of the body 2 of the spout, the other to that of the jacket 10, were placed simultaneously in a deformable mold comprised of an axial mold designed to form a recess corresponding to the flow channel 9. The entire assembly was subjected to isostatic pressing. The same carbonaceous binder system was used for the body 2 and for the jacket 10. The use of the same binder is a great advantage because it permits a greater cohesion for the piece and assures a better bond at the interface between the body 2 and the jacket 10.

Figure 2:
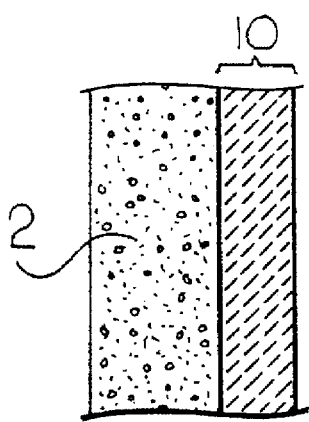
FIGS. 2 and 3 are partial, enlarged views of a portion of the spouts shown in FIG. 1.
Figure 3:
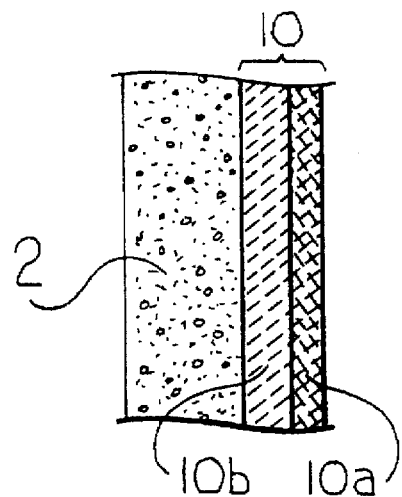

FIGS. 2 and 3 show a portion of the spout of FIG. 1 prior to the preheating operation (FIG. 2) and after preheating (FIG. 3). The layer 2 corresponding to the body and the layer 10 corresponding to the thickness of the jacket before preheating can be distinguished in FIG. 2. The layer 2 forming the body remained identical in FIG. 3. On the other hand, the layer 10 is broken down thereafter into a layer 10a that constitutes the oxidized sintered dense layer impermeable to gases described previously and a layer 10b that was not oxidized became it was protected from oxidation by the layer 10a. Its composition thus remained identical to the initial composition that it had prior to preheating. Consequently, it is evident that the spout, which initially was comprised of only two distinct layers, is now comprised of three different layers. Preferably, it also includes permeability reduction agents in the jacket 10. These impermeability agents are, for example, metallic silicon, borax, boron carbide ($B_4C$), boron nitride (BN). The purpose of these agents is to reduce the permeability of the layer 10b in order to form a supplementary barrier for opposing the circulation of gases between the liquid steel circulating in the flow channel 9 and the body of refractory material 2.

Figure 4:
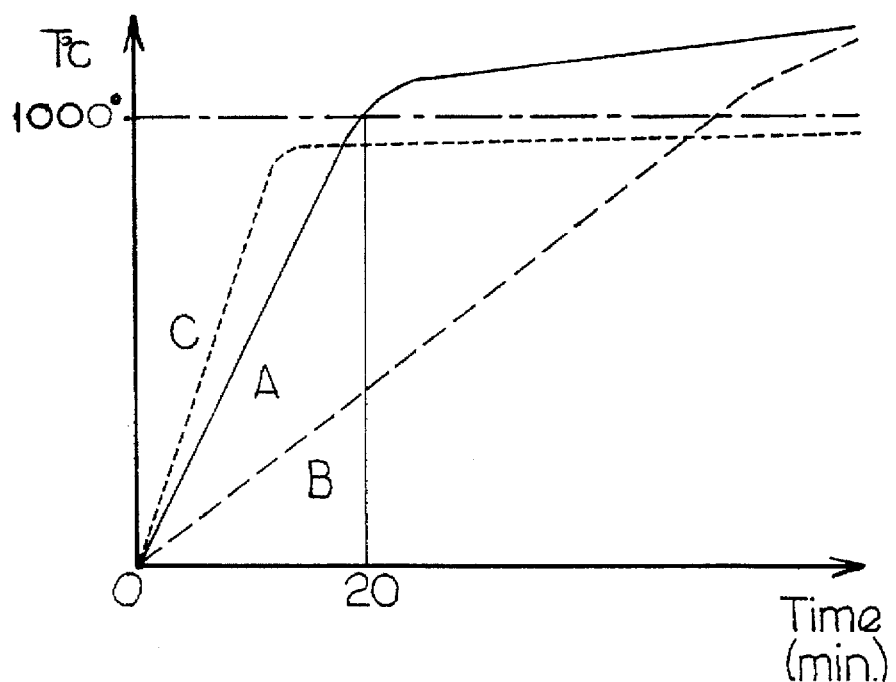
FIG. 4 is a scheme that illustrates the mode of preheating that is preferably used for the creation of a sintered dense layer impermeable to gases in a spout according to the present invention.

FIG. 4 is a graph that illustrates the correct manner of preheating a spout of the invention. According to curve A, the temperature of the spout was raised rapidly to a temperature at least equal to 1000° C. This temperature was measured in the refractory material inside of the channel 4. This was effected within less than 20 minutes. In effect, as elucidated above, two phenomena occur simultaneously during the preheating: oxidation of the layer containing carbon, and the creation of a sintered dense layer.

If the impermeable sintered dense layer 10a shown in FIG. 3 is not formed rapidly, the oxidation would continue through the entire thickness of the jacket 10 and could also reach the body 2. In order to avoid this, it is necessary to reach the sintering temperature rapidly, i.e., a temperature at least equal to 1000° C., as shown schematically in FIG. 4. It is thus necessary that the capacity of the burners used for preheating be sufficient to permit reaching this temperature rapidly.

Curve B illustrates an excessively slow temperature rise. The temperature of 1000° C. necessary so that the sintering could be conducted under good conditions is attained only after an excessively long period of time, definitely longer than 20 minutes. Under these conditions, an excessive decarburization of the jacket 10 occurs and it would not be possible to obtain a sufficiently impervious layer. In curve C the temperature rise is rapid, but the maximum temperature reached remains below 1000° C. Consequently, sintering of the layer 10a will not take place under good conditions in this case either.

Figure 5:
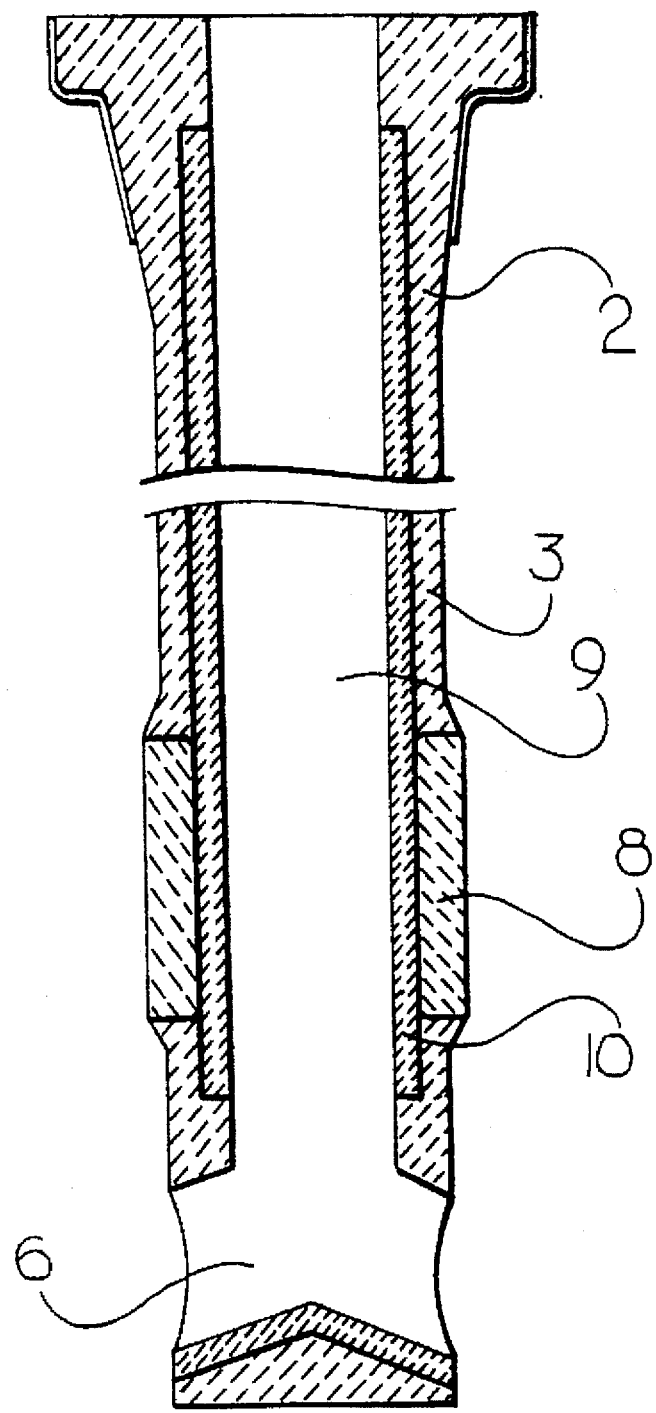
FIG. 5 is a longitudinal view of an actualization variant of a pouring spout according to the invention.

FIG. 5 shows a further presently preferred embodiment of the invention which is a slight variant of the spout of FIG. 1. The difference between the embodiments of FIGS. 1 and 5 resides in the fact that the jacket 10 of FIG. 5 does not totally cover the pouring channel 4. The upper part of the spout, called the seat zone, the lower part of channel 4 and the orifices 6 are not covered by the jacket 10. In addition, the spout of the invention depicted in FIG. 5 may be covered externally in a known manner with an enamel glaze layer 3 to avoid oxidation of the refractory material in the body 2 during preheating and use. However, this enamel layer should not be present on the jacket 10 because it would prevent its oxidation during preheating and thus its superficial densification, which is a desired effect according to the present invention in order to create a sintered dense layer, as explained above.

Figure 6:
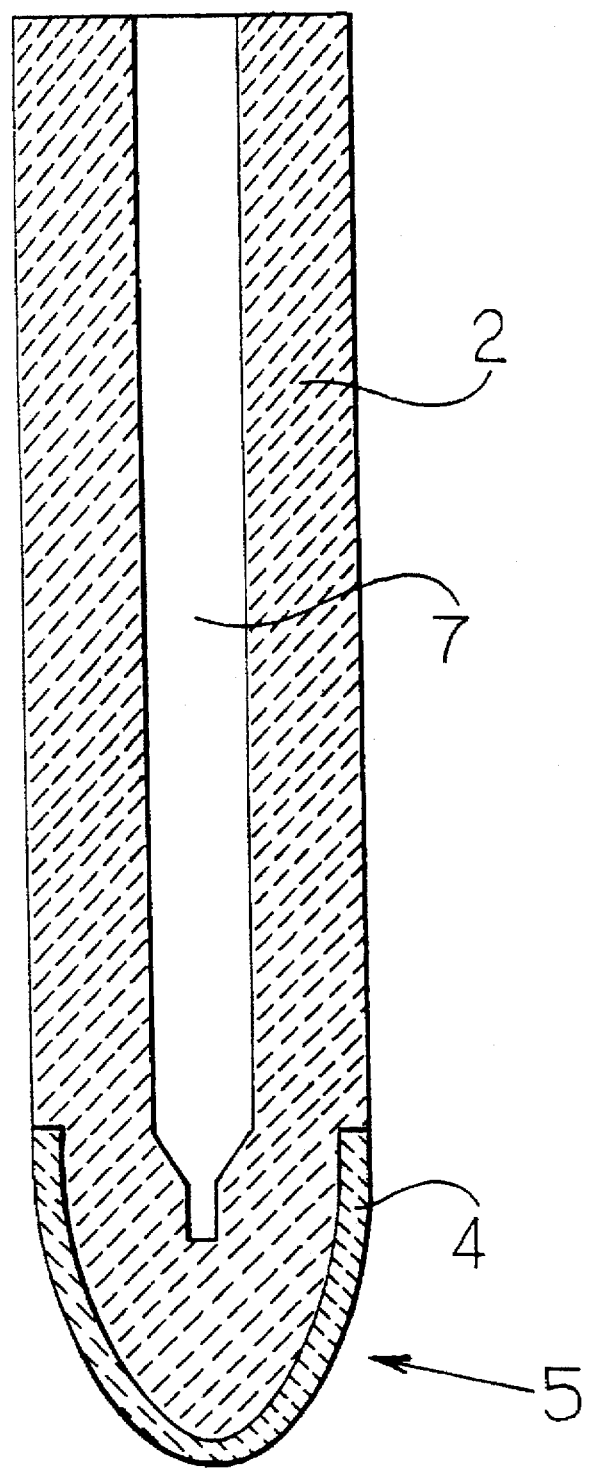
FIG. 6 is a longitudinal sectional view of a stopper rod according to the present invention.

In FIG. 6, the stopper rod has a body 2 of elongated form. An axial channel 3 is left in this body by the pressing mandrel. The axial channel 2 extends from the upper end of the stopper rod down to a short distance from its lower end. The upper part of the body can be connected, by means not shown, to a raising mechanism that facilitates displacing it vertically to regulate the flow of the liquid steel. At its lower end the stopper rod has a rounded nose 5. The body 2 of the stopper rod is of a traditional refractory material, e.g., a material containing 20–30% carbon and one or more refractory oxides such as alumina, zirconia, silica, magnesia, etc.

The external layer 4 of the nose 5 is comprised of a refractory material containing a low graphite content. The total firing loss of this material is less than 9%. This means that when this material is oxidized during the preheating stage of the stopper rod, the graphite that it contains and the carbon contained in the binder represent 9% or less of the weight of refractories. In addition, the external layer 4 contains a substantial amount of a refractory oxide such as alumina. Finally, the material constituting the external layer 4 of the nose contains sintering precursors, notably calcined alumina, reactive calcined alumina, fumed silica or clays. The total amount of refractory oxide is at least 80%. The sintering precursors are generally small-size grains, i.e., grains with a large specific surface area. The contact surface between the grains is thus increased. Calcined alumina presents a substantial specific surface, and reactive, calcined alumina an even more substantial specific surface. Fumed silica produces an alumina-silica reaction for creating mullite. Densification of layer 4 then occurs by mullitization. The clay-type systems also create ceramic bonds at a relatively low temperature on the order of 1000° C. to 1100° C. Due to the presence of one or more of these sintering precursors, a grain-to-grain bond can be created between the alumina grains (ceramic bond) at a relatively low temperature, e.g., 1000° C. This layer is dense, hard and has pores of small diameter. It is thus impermeable to gases. This layer is preferably formed during the preheating of the stopper rod, but it can also be achieved previously. The preheating operation permits oxidation of the carbon contained in the external layer 4 and thus eliminating it. A layer without carbon is thus obtained on the outer surface of the nose 5. It should be noted that this layer without carbon has only a slight thickness. For example, if the thickness of the layer 4 is 10 mm, the thickness of the decarburized layer will typically be 3 mm and no more than 5 mm. It is thus evident that a substantial part of the thickness of layer 4 is not decarburized during preheating. In fact, two simultaneous phenomena are observed during this operation. On the one hand, the oxidation of carbon which increases the permeability of the jacket material to an extent that is greater, the higher the carbon content. This is why the carbon content of the jacket material generally should not be high, and in any case, should not exceed 9%. On the other hand, in parallel with the oxidation of carbon, the sintering phenomenon occurs, which tends, on the contrary, to create an impermeable layer that opposes the continuation of decarburization toward the interior of the refractory material. For the stopper rod to function satisfactorily, it is necessary that the sintering of the superficial layer rapidly override its oxidation. This is why the previously mentioned sintering precursors were provided for the purpose of facilitating and accelerating the sintering.

The stopper rod shown in FIG. 6 was produced by the process of isostatic copressing. Two mixtures, one corresponding to the composition of the body 2 of the stopper rod, the other to that of the external layer 4, were placed simultaneously in a deformable mold comprised of an axial mandrel designed to form a recess corresponding to the channel 7. The entire assembly was subjected to isostatic copressing. The same binder was used for the body 2 and for the external layer 4. The use of the same binder is a great advantage because it facilitates a greater cohesion of the piece and assures a better bond between the body 2 and the external layer 4.

As in the preceding example, the nose 5 of the stopper rod which was initially comprised of two different layers, namely, the body 2 and the external layer 4, will be composed of three different layers after a preheating stage. Agents for reducing the permeability in the layer 4 are preferably included also. These impermeability agents are, e.g., metallic silicon (Si), borax ($B_2O_3$), boron carbide ($B_4C$), boron nitride (BN). These agents are for the purpose of reducing the permeability of the layer in order to form a supplementary barrier for opposing the circulation of gases between the liquid steel contained in the ladle or in the distributor and the body of refractory material 2.

EXAMPLE

The composition of a mixture example for the constitution of a sintered layer according to the invention and the physical properties of this layer prior to sintering/oxidation are given below.

| Composition | % by weight |
| --- | --- |
| Alumina ($Al_2O_3$) | 80–90 |
| Carbon (C) | 2–10 |
| Metallic additives (i.e., Si, $B_4C$) | 0–5 |
| Binder Oxides (i.e., clay, $SiO_2$) | 0–5 |
| | 100 |
| Physical properties | |
| Modulus of rupture at ambient temperature | 10–12 MPa |
| Density (g/cm$^3$) | 2.5–3.2 |
| Porosity (%) | 15.8–16.5 |
| Specific gravity (g/cm$^3$) | 3.3–3.6 |
| Modulus of elasticity | 22.5–23.5 GPa |
| Modulus of rupture when hot | 4.0–5.0 MPa |

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

We claim:

1. A refractory article for the pouring of steel, comprising a body of a refractory material containing carbon and one or more metal oxides, said article having a refractory layer integral with the body and covering molten steel contacting surfaces of said refractory article, containing one or more metal oxides, 4–9% by weight carbon and at least one sintering precursor, wherein said layer is adapted to form a densified, carbon free and gas impermeable surface when the layer is heated to a temperature above 1000° C. in an oxygen bearing atmosphere such that the carbon in the layer is removed by oxidation along the surface to provide a porous refractory structure which is simultaneously densified by virtue of the sintering precursor.

2. Article according to claim 1, wherein the sintering precursors are chosen from the group consisting of calcined alumina, reactive calcined alumina, fumed silica, clays and fine particles of oxides.

3. Article according to claim 1, wherein the layer, prior to heating above 1000° C. contains at least 4% and no more than 9% by weight of carbon, of which 1.5–6% is in graphite form.

4. Article according to claim 1, wherein the layer is in a form of an insert produced separately from the body and then joined to the body.

5. Article according to claim 1, wherein the layer is copressed with the body.

6. Article according to claim 1, wherein a substantially identical carbonaceous binder is used in the refractory material forming the body and in the layer.

7. Article according to claim 1, wherein the permeability reducing agents are one or more agents chosen from the group consisting of borax, silicon carbide, boron carbide, boron nitride and metallic additions, including silicon metal.

8. Article according to claim 1, wherein the one or more metal oxides of the layer is comprised of at least 80% by weight alumina.

9. Article according to claim 1, wherein the layer is in an unglazed condition.

10. Article according to claim 1, wherein the layer has a thickness less than 10 mm.

11. Article according to claim 1, wherein the thickness of the gas impermeable, densified, carbon free surface of the layer is adapted to be less than 5 mm.

12. Article according to claim 1, wherein the article is a pouring spout.

13. Article according to claim 1, wherein the article is a stopper rod.

14. A refractory article for the pouring of steel, comprising a body of a carbon bonded refractory material including alumina and graphite constituents, said body having an integral layer of a refractory material thereon covering molten steel contacting surfaces of said refractory article, the refractory material of said layer comprising a mixture of 80 to 90% by weight alumina; 2 to 10% by weight carbon; up to 5 weight % of one or more sintering precursors selected from the group consisting of calcined alumina, reactive calcined alumina, fumed silica and clays; and up to 5 weight % of one or more permeability reducing agents chosen from the group consisting of borax, silicon carbide, boron carbide and metallic additions including silicon metal; and wherein said layer is adapted to form a densified, carbon free and gas impermeable surface when said layer is heated to a temperature of above 1000° C. in an oxygen bearing atmosphere.

15. The article of claim 14 in the form of one of a pouring nozzle or stopper rod and wherein said densified, carbon free and gas impermeable surface is formed when the article is subjected to a preheat treatment prior to service.

* * * * *

UNITED STATES PATENT AND TRADEMARK OFFICE
CERTIFICATE OF CORRECTION

PATENT NO. : 5,691,061
DATED : November 25, 1997
INVENTOR(S) : Eric Hanse and Phillipe Dumas It is certified that error appears in the above-identified patent and that said Letters Patent is hereby corrected as shown below:

Column 3 Line 56 "carded" should read --carried--.

Column 5 Line 50 "became" should read --because--.

Column 8 Line 9, under "Composition" column: "(i.e., clay, SiO$_2$)" should be part of "Binder Oxides".

Signed and Sealed this

Twenty-first Day of April, 1998

Attest:

BRUCE LEHMAN

Attesting Officer

Commissioner of Patents and Trademarks